(12) United States Patent
Yamamoto et al.

(10) Patent No.: US 11,207,802 B2
(45) Date of Patent: Dec. 28, 2021

(54) METHOD FOR NON-PENETRATION JOINING OF MEMBERS AND NON-PENETRATION JOINING STRUCTURE

(71) Applicant: NITTO SEIKO CO., LTD., Kyoto (JP)

(72) Inventors: Kozi Yamamoto, Ayabe (JP); Hidetaka Rokudo, Ayabe (JP)

(73) Assignee: NITTO SEIKO CO., LTD., Kyoto (JP)

( * ) Notice: Subject to any disclaimer, the term of this patent is extended or adjusted under 35 U.S.C. 154(b) by 593 days.

(21) Appl. No.: 16/080,992

(22) PCT Filed: Feb. 28, 2017

(86) PCT No.: PCT/JP2017/007940
§ 371 (c)(1),
(2) Date: Aug. 29, 2018

(87) PCT Pub. No.: WO2018/003175
PCT Pub. Date: Jan. 4, 2018

(65) Prior Publication Data
US 2020/0108527 A1    Apr. 9, 2020

(30) Foreign Application Priority Data

Jun. 28, 2016   (JP) .............................. JP2016-127932
Jun. 30, 2016   (JP) .............................. JP2016-130421

(51) Int. Cl.
*B29C 33/48*   (2006.01)
*B29C 45/44*   (2006.01)

(52) U.S. Cl.
CPC ........ *B29C 33/485* (2013.01); *B29C 45/4435* (2013.01); *B29C 45/4471* (2013.01)

(58) Field of Classification Search
CPC .......... B29C 66/00; B29C 65/00; B29C 65/44
(Continued)

(56) References Cited

U.S. PATENT DOCUMENTS 6,371,357 B1   4/2002   Watanabe
6,376,815 B1   4/2002   Watanabe
(Continued)

FOREIGN PATENT DOCUMENTS

CN   101883657 A   11/2010
CN   103732373 A   4/2014
(Continued)

OTHER PUBLICATIONS

The extended European search report issued by the European Patent Office dated Jan. 8, 2020, which corresponds to European Patent Application No. 17819545.9-1108 and is related to U.S. Appl. No. 16/080,992.

(Continued)

*Primary Examiner* — Jeffrey M Wollschlager
*Assistant Examiner* — Xue H Liu
(74) *Attorney, Agent, or Firm* — Studebaker & Brackett PC (57) ABSTRACT

There is provided a method for non-penetration joining of members. The method includes: keeping a joining member having a protruding part by a receiving mold so that the protruding part is exposed; placing a joined member over the joining member so that the protruding part of the joining member is positioned in a blind hole of the joined member, and compressing the joined member against the receiving mold to plastically deform the joined member and the joining member at the same time and to wrap excess thickness of the joined member around an undercut part while forming the undercut part on the joining member, thereby non-detachably joining both the members.

10 Claims, 11 Drawing Sheets

(58) Field of Classification Search
USPC .................................. 264/293; 29/505, 517
See application file for complete search history.

(56) References Cited

U.S. PATENT DOCUMENTS

| | | |
|---|---|---|
| 2002/0113063 A1 | 8/2002 | Watanabe |
| 2002/0113064 A1 | 8/2002 | Watanabe |
| 2009/0184569 A1 | 7/2009 | Inagaki et al. |
| 2012/0148908 A1 | 6/2012 | Ito |
| 2014/0141115 A1 | 5/2014 | Sorimoto |

FOREIGN PATENT DOCUMENTS

| | | |
|---|---|---|
| EP | 1 406 027 A1 | 4/2004 |
| EP | 1 520 639 A1 | 4/2005 |
| EP | 2 463 934 A2 | 6/2012 |
| JP | S56-091641 U1 | 7/1981 |
| JP | S60-181220 U1 | 12/1985 |
| JP | H06-031332 U | 4/1994 |
| JP | H11-285775 A | 10/1999 |
| JP | 2004-204916 A | 7/2004 |
| JP | 2008-275003 A | 11/2008 |
| JP | 2012-138342 A | 7/2012 |
| JP | 2013-075297 A | 4/2013 |

OTHER PUBLICATIONS

International Search Report issued in PCT/JP2017/007940; dated May 9, 2017.
Written Opinion issued in PCT/JP2017/007940; dated May 9, 2017.
Office Action corresponding to Japanese Patent Application No. 2016-127932; mailed by the Japanese Patent Office dated May 22, 2018.
Office Action corresponding to Japanese Patent Application No. 2016-130421; mailed by the Japanese Patent Office dated May 22, 2018.
Office Action corresponding to Japanese Patent Application No. 2016-127932; mailed by the Japanese Patent Office dated Jan. 16, 2018.
Office Action corresponding to Japanese Patent Application No. 2016-130421; mailed by the Japanese Patent Office dated Jan. 16, 2018.
An Office Action mailed by The State Intellectual Property Office of People's Republic of China dated Nov. 5, 2019, which corresponds to Chinese Patent Application No. 201780014002.8 and is related to U.S. Appl. No. 16/080,992.
An Office Action; "Notification of Reasons for Refusal," mailed by the Japanese Patent Office dated Jun. 25, 2019, which corresponds to Japanese Patent Application No. 2018-152410 and is related to U.S. Appl. No. 16/080,992; with English language translation.

<RELATED ART>

\<RELATED ART\>

METHOD FOR NON-PENETRATION JOINING OF MEMBERS AND NON-PENETRATION JOINING STRUCTURE

CROSS-REFERENCE TO RELATED APPLICATIONS

This application is based on and claims priority under 35 U.S.C. § 119 from Japanese Patent Application No. 2016-127932 filed on Jun. 28, 2016 and Japanese Patent Application No. 2016-130421 filed on Jun. 30, 2016.

TECHNICAL FIELD

The present invention relates to a method for non-penetration joining of members and a non-penetration joining structure of members whereby a joining member and a joined member made of a metal material or a resin material are joined with high airtightness.

BACKGROUND ART

In the related art, when manufacturing a composite component by joining a joining member and a joined member made of a metal material, airtightness is required at the joined portion, depending on utilities of the joining member. For example, in a case of a lithium battery, a lead wire and the like are attached to an electrode terminal by welding or the like. Therefore, for the electrode terminal, a composite component obtained by joining a copper member having high conductivity and an aluminum member having high corrosion resistance is used. Usually, when manufacturing the composite component, a fastening method by general caulking is used. That is, a member for which processing such as welding is to be performed is configured as a flat plate member, the flat plate member is formed with a through-hole, the other member is formed to have a step shape having a small-diameter part, and the small-diameter part is inserted into the through-hole and is then caulked, so that both the members are joined.

Figure 11A:
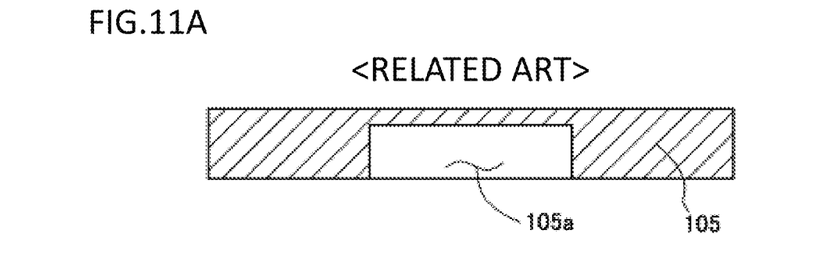
FIG. 11A is a process view illustrating a joining method of members in accordance with the related art.
Figure 11B:
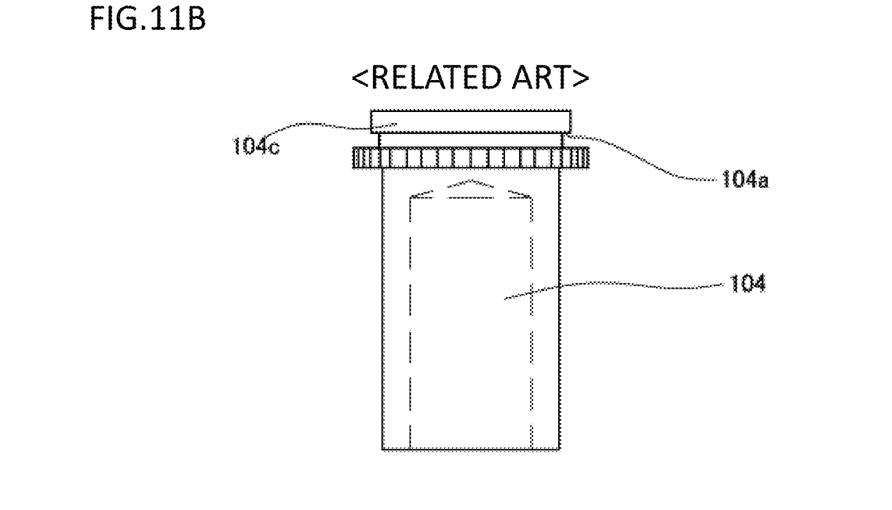
FIG. 11B is a process view illustrating a joining method of members in accordance with the related art.
Figure 11C:
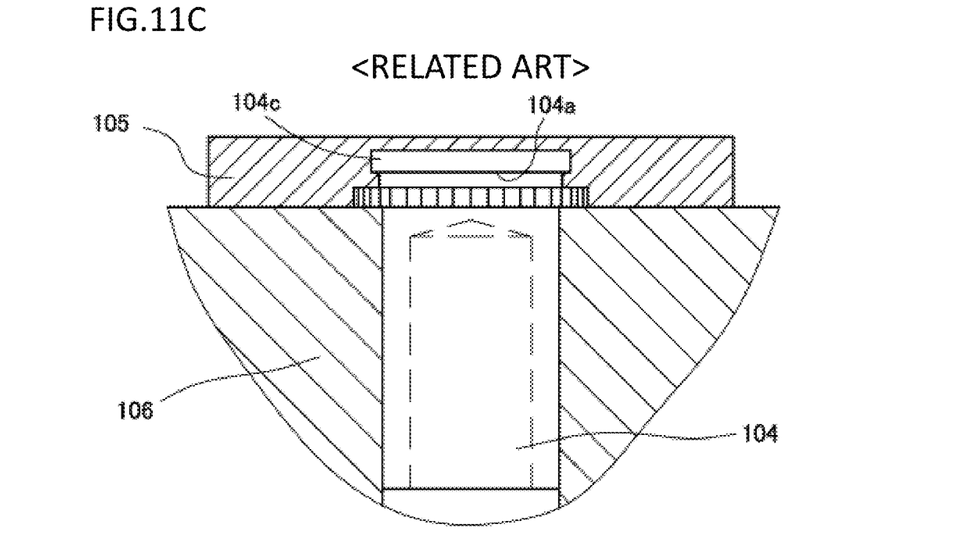
FIG. 11C is a process view illustrating a joining method of members in accordance with the related art.

When the composite component is used as an external electrode terminal of the lithium battery in which an electrolyte is filled, the electrolyte may be leaked from the joined portion, which is a caulked portion, due to aging degradation. In order to prevent this leakage, Patent Document 1 (JP-A-2012-138342) discloses a terminal structure of the lithium battery. In this terminal structure, as shown in FIG. 11A, a flat plate member 105 composed of an aluminum member having a blind hole 105a and a rod-shaped joining member 104 composed of a copper member having a protruding part 104c shown in FIG. 11B are prepared in advance, and both the members are then joined. Specifically, as shown in FIG. 11C, in a state where the joining member 104 is positionally determined in a receiving mold 106, the flat plate member 105 is pressed by a press machine so that the blind hole 105a (refer to FIG. 11A) of the flat plate member 105 is fitted to the protruding part 104c. By this joining method, since the joined portion is located in the blind hole 105a of the flat plate member 105, a composite component having high airtightness is manufactured. For this reason, even when the composite component is used as an external power supply terminal 3 at a part that is to communicate with a closed inside such as a battery can 1b of a lithium battery (refer to FIG. 2) 1 having liquid filled therein, there is no concern that the liquid is to be leaked from the joined portion.

CITATION LIST

Patent Document

Patent Document 1: JP-A-2012-138342

SUMMARY OF THE INVENTION

However, according to the joining method of members, in order to prevent the flat plate member 105 from being separated from the rod-shaped joining member 104, the joining member 104 should be processed to have a groove part 104a around which excess thickness of the flat plate member 105 is to be wrapped upon the pressing, as shown in FIG. 11B. For this reason, a structure of the joining member 104 is complex, and a joining process of joining the joining member 104 and the flat plate member 105 should be performed in addition to the manufacturing process of each of the joining member 104 and the flat plate member 105, so that the manufacturing cost of the composite component increases.

Embodiments of the present invention has been made in view of the above situations, and includes keeping a joining member having a protruding part by a receiving mold so that the protruding part is exposed, placing a joined member over the joining member so that the protruding part of the joining member is positioned in a blind hole of the joined member, and compressing the joined member against the receiving mold to plastically deform the joined member and the joining member at the same time and to wrap excess thickness of the joined member around an undercut part while forming the undercut part on the joining member, thereby non-detachably joining both the members.

By this configuration, it is possible to join the joining member and the joined member while forming the joined member so that the protruding part of the joining member is not exposed. Also, a composite component can be manufactured in which the joining member and the joined member are joined in a state of non-penetration, i.e., in a state in which airtightness is maintained at a joined portion, and it is not necessary to form the joined member in advance, so that it is possible to save the manufacturing cost of the composite component. Also, the undercut part of the joining member functions as a groove around which the excess thickness of the joined member is to be wrapped, so that it is possible to non-detachably join both the members without performing extra processing such as groove processing in advance. Furthermore, the excess thickness of the joined member is caulked by a backside of the undercut part, so that adhesiveness between the joining member and the joined member is improved and high axial strength can be thus obtained.

Also, according to the embodiments of the present invention, in order to improve the adhesiveness between the joining member and the joined member by caulking the excess thickness of the joined member by the backside of the undercut part, preferably, the joined member and the joining member are closely contacted at the undercut part.

Also, according to the embodiments of the present invention, in order to make fluidity of the joined member better to improve the adhesiveness between the joining member and the joined member, the joined member is made of a material softer than the joining member, and the joining member is caused to be deformed using work-hardening of the joined member.

In order to increase a friction resistance in a rotating direction to improve strength in the rotating direction, the protruding part of the joining member of the embodiments of the present invention has a step part widely enlarged in the vicinity of a protruding end, the undercut part is formed at a position closer to the protruding end than the step part, and the excess thickness of the joined member is wrapped around an outer side of the step part, as well, so that the joining member and the joined member are bonded.

Also, in order to increase the resistance in the rotating direction to improve the strength in the rotating direction as the excess thickness of the joined member is introduced, an outer periphery of the step part of the joining member of the embodiments of the present invention has a tooth shape.

The embodiments of the present invention further provides a non-penetration joining structure that is to be manufactured by the method for non-penetration joining of members. The non-penetration joining structure includes a joining member having a protruding part, a joined member having a blind hole in which the protruding part of the joining member can be inserted, and an undercut part plastically processed at the protruding part of the joining member by compressing the joined member with the protruding part of the joining member being inserted in the blind hole of the joined member and configured to non-detachably join both the members by wrapping excess thickness of the joined member around the undercut part.

By this configuration, the undercut part of the joining member forms a groove around which the excess thickness of the joined member is wrapped, so that the joined member is prevented from being separated. Also, the excess thickness of the joined member is caulked by a backside of the undercut part of the joining member, so that the adhesiveness between the members is improved and the high axial strength is thus obtained. Also, since the joined portion is in a non-penetration state in the blind hole, the joining structure having high airtightness is obtained.

Also, according to the non-penetration joining structure, in order to increase the axial strength, i.e., the separation strength, the joined member and the joining member are closely contacted at the undercut part.

In order to make fluidity of the joined member better to improve the adhesiveness between the joining member and the joined member, the joined member of the embodiments of the present invention is made of a material softer than the joining member, and the joining member is caused to be deformed using work-hardening of the joined member.

In order to increase the resistance in the rotating direction to obtain high strength in the rotating direction, the protruding part of the embodiments of the present invention has a step part widely enlarged in the vicinity of a protruding end, the undercut part is formed at a position closer to the protruding end than the step part, and the excess thickness of the joined member is wrapped around an outer side of the step part, as well, so that the joining member and the joined member are joined. Also, preferably, an outer periphery of the step part has a tooth shape.

According to an aspect of the present invention as described above, it is possible to provide the method for non-penetration joining of members and the non-penetration joining structure whereby the joining member and the joined member are joined with high airtightness and at low cost. Also, when the joining member and the joined member made of a metal material are joined, it is possible to provide a composite member having high conductivity because the airtightness between the members is improved.

BRIEF DESCRIPTION OF THE DRAWINGS

Exemplary embodiments of the present invention will be described in detail based on the following figures, wherein.

DETAILED DESCRIPTION OF ILLUSTRATIVE EMBODIMENTS

First Illustrative Embodiment

Figure 2:
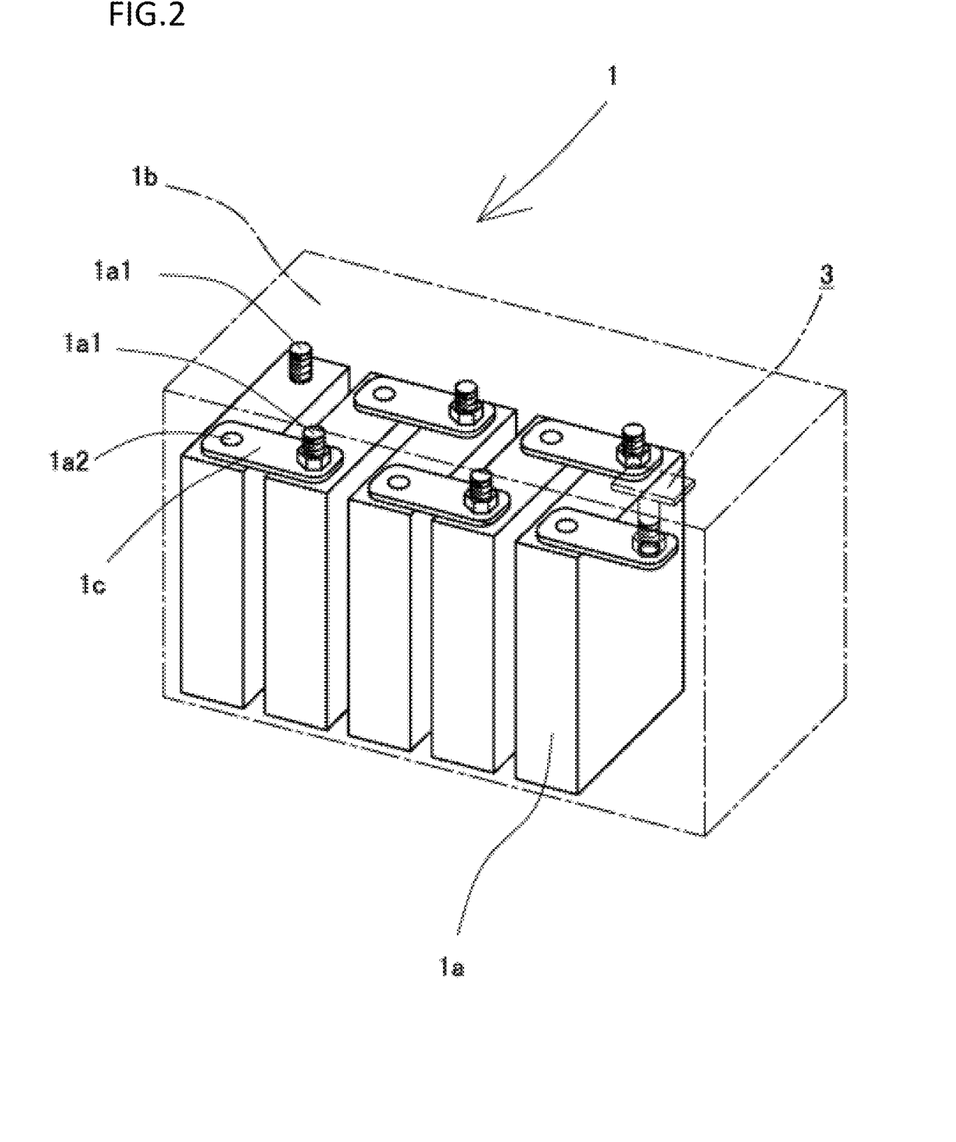
FIG. 2 is a schematic view of a lithium battery, which is an example of utilities of a composite component to be manufactured by the method for non-penetration joining of metal components in accordance with the first illustrative embodiment of the present invention.

Hereinafter, a method for non-penetration joining of members in accordance with a first illustrative embodiment of the present invention (hereinafter, referred to as 'first joining method') will be described with reference to the drawings. As shown in FIG. 2, a reference numeral '1' indicates a lithium battery, which is an example of a utility where a composite component to be manufactured by the first joining method is to be used as an external electrode terminal. The lithium battery 1 has a battery can 1b in which a plurality of battery packs 1a is accommodated, and a positive electrode-side external electrode terminal (not shown) and a negative electrode-side external electrode terminal (hereinafter, referred to as 'negative-side external terminal) 3 are attached to an upper surface of the battery can 1b. The battery pack 1a has positive and negative electrode terminals 1a1, 1a2 at an upper end. A bus bar 1c is connected between the negative electrode terminal 1a2 of one of the adjacent battery packs 1a, 1a and the positive electrode terminal 1a1 of the other battery pack 1a. The plurality of battery packs 1a is connected in series. Also, the bus bar 1c is connected to the negative electrode terminal 1a2 of the battery pack 1a of the most rear row, as well, and an end portion of the bus bar 1c is connected with the negative-side external terminal 3.

Figure 3A:
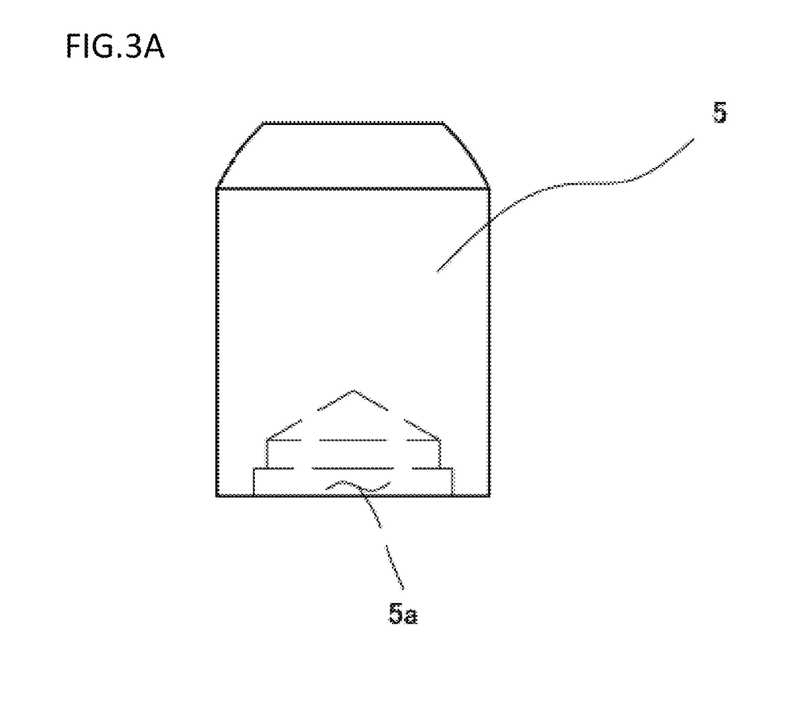
FIG. 3A is front view of a joined member in accordance with the first illustrative embodiment of the present invention.
Figure 3B:
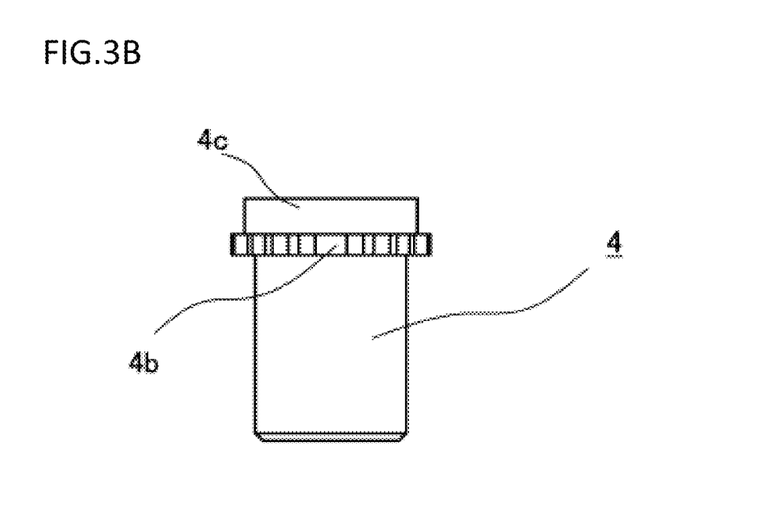
FIG. 3B is front view of a joining member in accordance with the first illustrative embodiment of the present invention.
Figure 4A:
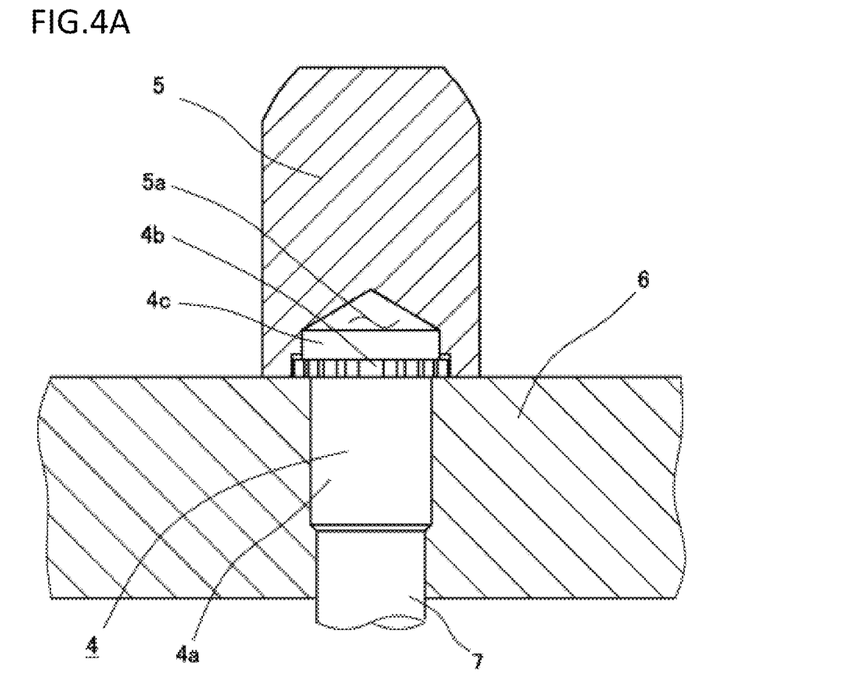
FIG. 4A is sectional view of main parts depicting a fitting process of the joined member illustrating the method for non-penetration joining of members in accordance with the first illustrative embodiment of the present invention.
Figure 4B:
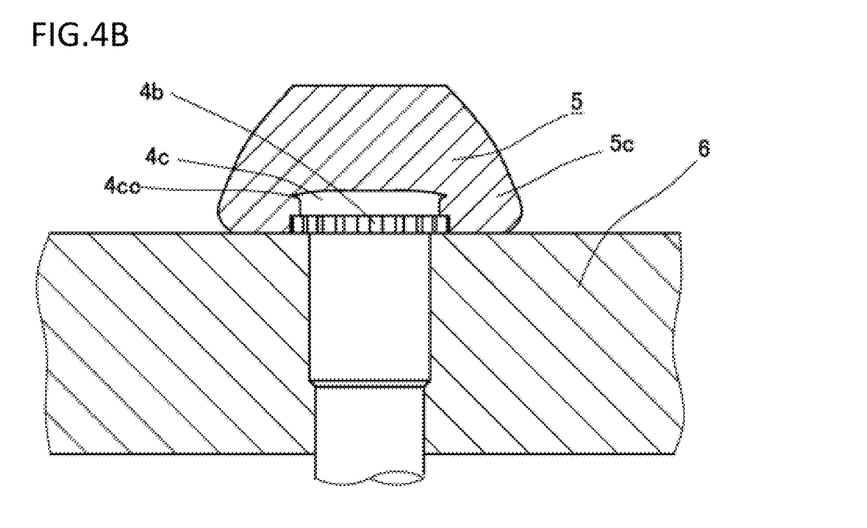
FIG. 4B is sectional view of main parts depicting a reserve preforming process of the joined member illustrating the method for non-penetration joining of members in accordance with the first illustrative embodiment of the present invention.
Figure 5:
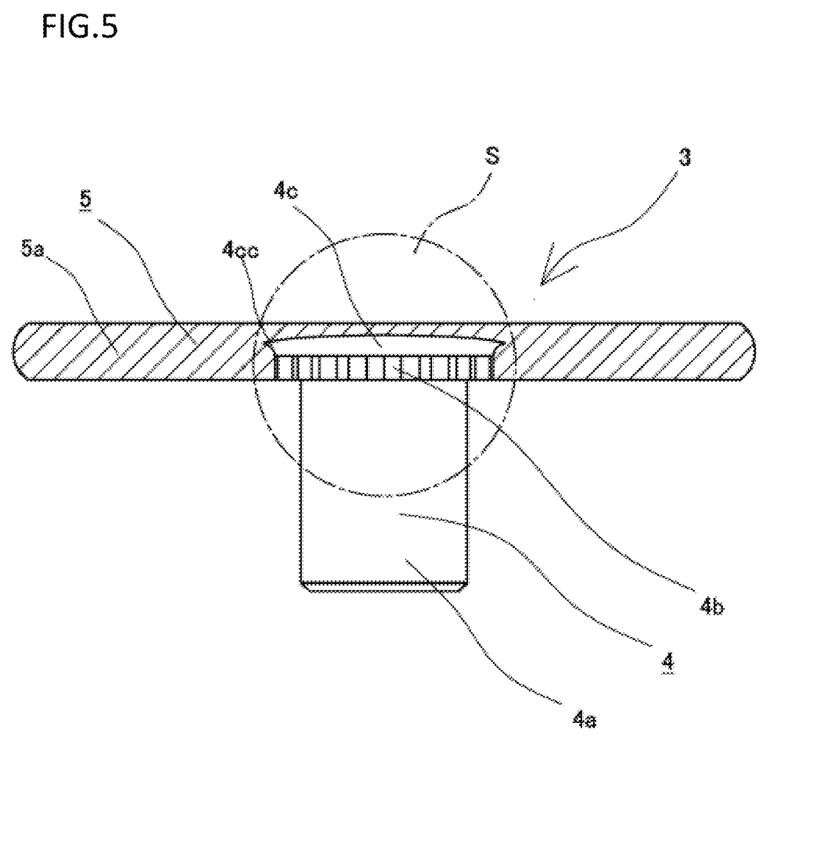
FIG. 5 is a sectional view of main parts of a non-penetration joining structure of members in accordance with the first illustrative embodiment of the present invention.

As shown in FIG. 5, the negative-side external terminal 3 is configured by a joining member 4 composed of a copper member and a joined member 5 composed of an aluminum member softer than the joining member 4. The joining member 4 has a rod-shaped shaft part 4a, a step part 4b of which an outer shape is a tooth shape, which is an example of a non-circular shape, and a protruding part 4c continuing to the step part and protruding therefrom. The step part 4b is widely enlarged in the vicinity of a protruding end of the protruding part 4c, and is provided to secure a friction resistance in a rotating direction at the periphery of an outer side thereof. Also, the joined member 5 has a flat plate part 5b having a predetermined thickness and configured to cover the step part 4b and protruding part 4c of the joining member 4. As shown in FIGS. 3A and 3B, the joined member has a blind hole 5a in which the step part 4b and protruding part 4c of the joining member 4 can be fitted, before forming the joined member. As shown in FIGS. 4A, 4B and 5, the negative-side external terminal 3 has a non-penetration joining structure S for enabling non-detachably joining both the members by placing the joined member 5 over the joining member 4 so that the step part 4b and protruding part 4c of the joining member 4 are positioned in the blind hole 5a of the joined member 5 and compressing the joined member 5 against a receiving mold 6 (which will be described later) to plastically deform the joined member 5 and the joining member 4 at the same time and to wrap excess thickness of the joined member 5 around an undercut part 4cc while forming the undercut part 4cc on the joining member 4.

By the above structure, the undercut part 4cc of the joining member 4 forms a groove around which the excess thickness of the joined member 5 is wrapped, so that the joined member 5 is prevented from being separated. Also, the excess thickness of the joined member 5 is caulked by a backside of the undercut part 4cc of the joining member 4, so that adhesiveness between the joining member and the joined member is improved and high axial strength is thus obtained. Also, the excess thickness of the joined member 5 is wrapped around and into tooth-shaped gaps of the step part 4b, so that a resistance in a rotating direction increases and high strength in the rotating direction is obtained. In addition, since the joined portion is in a non-penetration state in the blind hole 5a, the joining structure having high airtightness is obtained. Thereby, even when the negative-side external terminal 3 is used at a part that is to communicate with a closed inside such as the battery can 1b of a lithium battery 1 having liquid filled therein, the liquid is not leaked. At the same time, it is possible to obtain the flat plate part 5b capable of sufficiently securing a space for welding a lead wire and the like and securing a corrosion resistance thereof. Also, since the joined member 5 is softer than the joining member 4, the fluidity of the joined member 5 is better, so that it is possible to further improve the adhesiveness. In the meantime, even when the joining member 4 and the joined member 5 are made of the same material, the similar effects are obtained although a degree of improvement on the adhesiveness is different.

Figure 1:
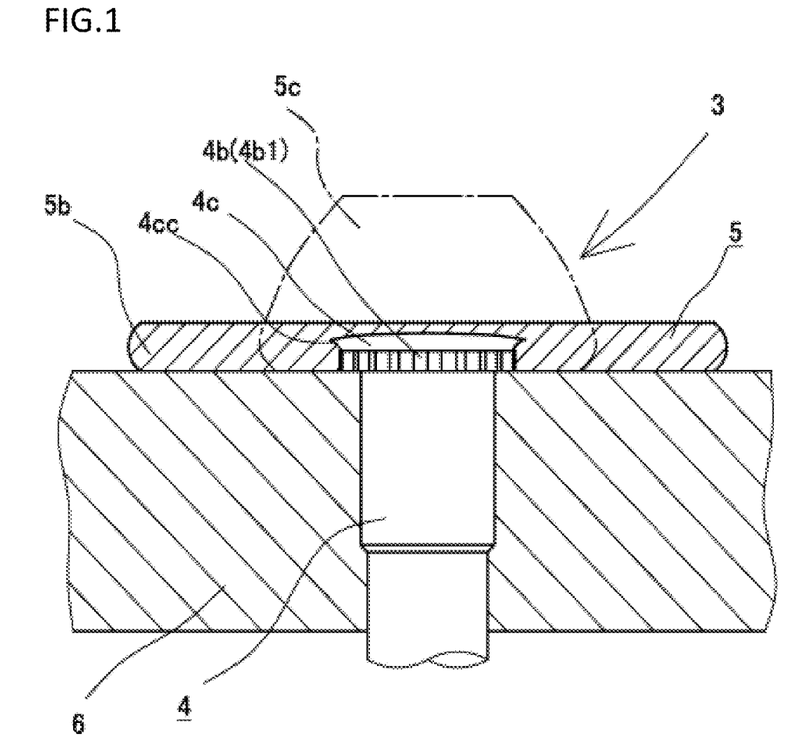
FIG. 1 is a forming process view of a joined member, illustrating a method for non-penetration joining of members in accordance with a first illustrative embodiment of the present invention.

The negative-side external terminal 3 is manufactured by the first joining method shown in FIGS. 1, 3 and 4. That is, the first joining method includes a manufacturing process (not shown) of the joining member 4 and a manufacturing process (not shown) of the joined member 5. Also, the first joining method includes a fitting process of placing the joined member 5 over the joining member 4 so that the step part 4b and protruding part 4c of the joining member 4 are fitted to the blind hole 5a of the joined member 5, as shown in FIG. 4A, a preforming process of compressing the joined member 5 to form a preformed part 5c having a preliminary shape before finish forming, as shown in FIG. 4B, and a forming process of forming the preformed part 5c of the joined member 5 into a flat plate shape within a range in which the protruding part 4c of the joining member 4 is not exposed. The fitting process includes positionally determining the shaft part 4a of the joining member 4 in the receiving mold 6 by a knockout pin 7, placing the joined member 5 over the joining member 4 from the upper so that the step part 4b and protruding part 4c of the joining member 4 are positioned in the blind hole 5a of the joined member 5, and fitting the members (refer to FIG. 4A). In this case, an advancing direction of the joined member 5 is not limited to "from the upper", and may be "from a horizontal direction" when the joining member 4 and the joined member 5 are arranged in the horizontal direction.

As shown in FIG. 4B, the preforming process of the joined member 5 includes a preforming pressing mold (not shown) configured to form the joined member 5, which is to be fitted to the step part 4b and protruding part 4c of the joining member 4, into the preformed part 5c having a preliminary shape before finish forming. The preforming pressing mold is configured to advance relative to the receiving mold 6 and to compress an upper part of the joined member 5, thereby forming the preformed part 5c corresponding to a forming hole formed in the preforming pressing mold, i.e., a preliminary shape. At this time, the excess thickness of the joined member 5 is wrapped around and into gaps between the step part 4b and protruding part 4c of the joining member 4 and an inner wall of the blind hole 5a of the joined member 5, so that the members are joined with the shaft part 4a of the joining member 4 being kept by the receiving mold 6. Thereby, even when the joined member 5 is not made of a material having favorable ductility, the secure forming of the joined member 5 is aided in the forming process. The preforming process is not a process that is to be necessarily performed in the first joining method. That is, when the joined member 5 is made of a material having favorable ductility, the joined member 5 may be directly formed through the forming process from the fitting process.

As shown in FIG. 1, the forming process includes a forming pressing mold (not shown) configured to form the flat plate part 5b having a predetermined thickness from the preformed part 5c of the joined member 5. The forming pressing mold is configured to advance relative to the preformed part 5c from the upper and to form the preformed part 5c into the flat plate part 5b having a predetermined thickness or having a predetermined thickness and a predetermined shape. At this time, a bottom dead point of the forming pressing mold is determined so that the protruding part 4c of the joining member 4 is not exposed, taking into consideration a thickness of the flat plate part 5b, the ductility of the joined member 5, a fitting depth between the protruding part 4c of the joining member 4 and the blind hole 5a of the joined member 5, hardness of the joining member 4, and the like.

In the first joining method, as shown in FIG. 4A, the shaft part 4a of the joining member 4 is positionally determined in the receiving mold 6 by the knockout pin 7 and the step part 4b is kept on an upper surface of the receiving mold 6 at the same time. Thereafter, after the joined member 5 is advanced so that the blind hole 5a is fitted with the step part 4b and protruding part 4c of the joining member 4, the preforming pressing mold is advanced relative to the receiving mold 6 and compresses an upper part of the joined member 5 to form the preformed part 5c, as shown in FIG. 4B. At this time, the preforming pressing mold plastically deforms the protruding part 4c of the joining member 4 via the joined member 5 softer than the joining member 4, flattens slightly outward an outer periphery of an upper end of the protruding part, and wraps the excess thickness of the joined member 5 around the undercut part 4cc while forming the undercut part 4cc on the joining member 4.

After retreating the preforming pressing mold, the forming pressing mold is advanced to a predetermined bottom dead point, relative to the receiving mold 6, as shown in FIG. 1. As the forming pressing mold is advanced, the forming pressing mold compresses the preformed part 5c to form the flat plate part 5b having a predetermined thickness. At this time, the preformed part 5c, i.e., the joined member 5 is formed so that the protruding part of the joining member 4c is not exposed, and at the same time, the joining member 4 and the joined member 5 are non-detachably joined. Furthermore, the members are joined in a state of non-penetration, i.e., in a state in which airtightness is maintained at the joined portion. At this time, the excess thickness of the preformed part 5c, i.e., the joined member 5 is wrapped around and into the gaps of the step part 4b having the tooth-shaped outer periphery, so that a large circular cylinder step part 4b1 is formed below a neck of the flat plate part 5b and a resistance in the rotating direction thus increases. Thereby, not only a friction resistance at the periphery of the outer side of the step part 4b of the joining member 4 but also the resistance in the rotating direction increases as a result of the wrapping of the excess thickness of the preformed part 5c around and into the gaps of the tooth-shaped step part, so that the strength in the rotating direction is improved.

Figure 6A:
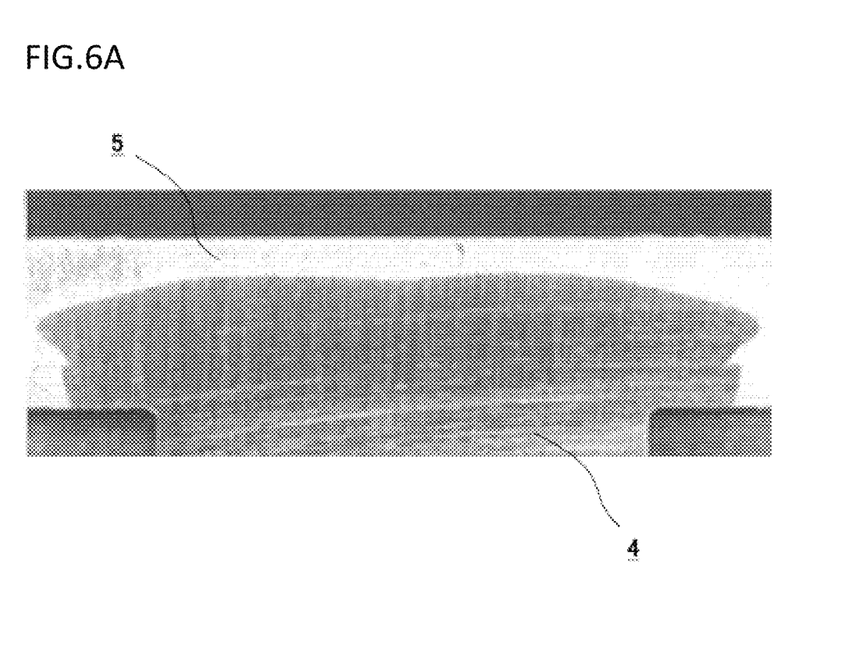
FIG. 6A is comparison photograph of enlarged sections of a non-penetration joining structure illustrating effects of the method for non-penetration joining of members in accordance with the first illustrative embodiment of the present invention.
Figure 6B:
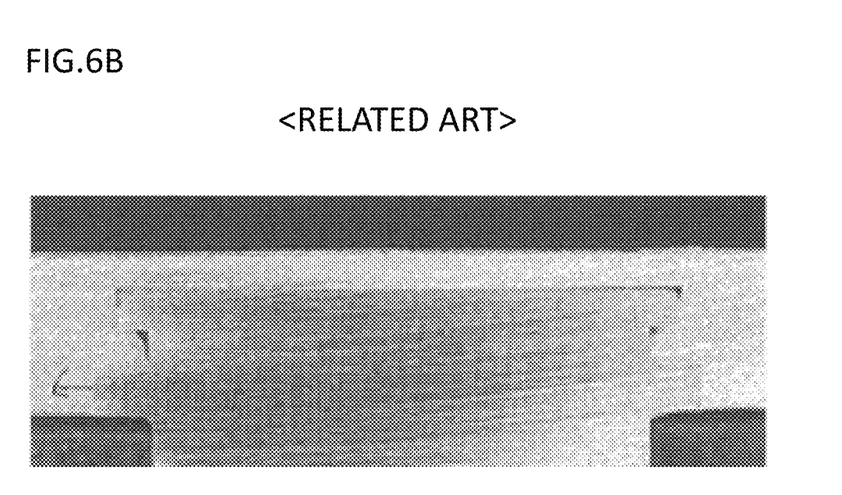
FIG. 6B is comparison photograph of enlarged section of a conventional structure illustrating effects of the method for non-penetration joining of members in accordance with the first illustrative embodiment of the present invention.

During the forming of the flat plate part 5b, the forming pressing mold plastically deforms the protruding part 4c of the joining member 4 via the preformed part 5c, so that the outer periphery of the upper end of the protruding part is further flattened outward and the undercut part 4cc is formed. During this forming, the undercut part 4cc of the joining member 4 caulks the excess thickness of the preformed part 5c at a backside of the undercut part, and the excess thickness can be wrapped around and into the gap between the step part 4b of the joining member 4 and the preformed part 5c. At this time, since the joining member 4 and the joined member 5 are joined at the undercut part 4cc through the compression of the protruding part 4c of the joining member 4 by the joined member 5 and the caulking by the joining member, a gap is not generated between both the members and high adhesiveness is obtained therebetween. This is also clear from an enlarged section photograph of the actual joined portion of the joining member 4 and the joined member 5, as shown in FIG. 6A. That is, in an enlarged section photograph of a joined portion shown in FIG. 6B in accordance with the related art, it can be seen that gaps (black portions of a boundary part) are recognized at several places of the joined portion and the wrapping of the excess thickness is not sufficient. In contrast, it can be seen that the gaps are not recognized at the joined portion in accordance with the first joining method, the excess thickness is sufficiently wrapped and the high adhesiveness is thus obtained between the joining member 4 and the joined member 5. In particular, in FIG. 6A, the aluminum member of A1070 is used for the joined member 5 and the copper member is used for the joining member 4, so that the joined member 5 is made of a material softer than the joining member 4. Thereby, since the joining member 4 is deformed using work-hardening of the joined member 5, the fluidity of the joined member 5 is enhanced, so that the favorable adhesiveness between the joining member 4 and the joined member 5 is considerably expressed.

Meanwhile, in the first joining method, it is not positively excluded that the joining member 4 is formed with the groove part 104a of the related art in advance.

Figure 7A:
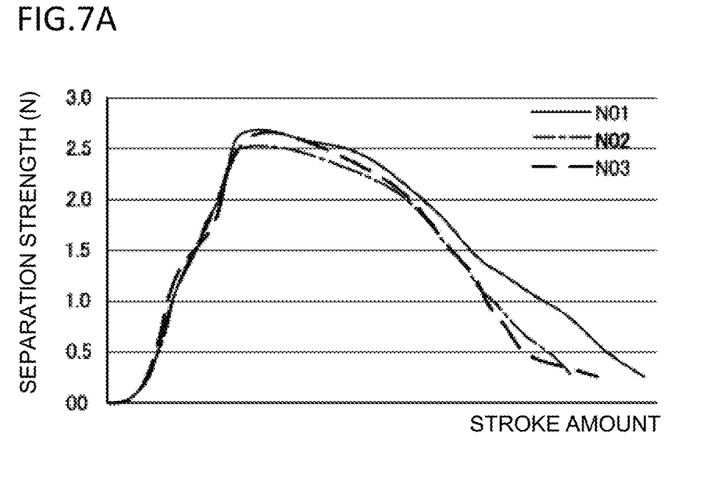
FIG. 7A is comparison characteristic view of separation strengths of the non-penetration joining structure illustrating effects of the method for non-penetration joining of members in accordance with the first illustrative embodiment of the present invention.
Figure 7B:
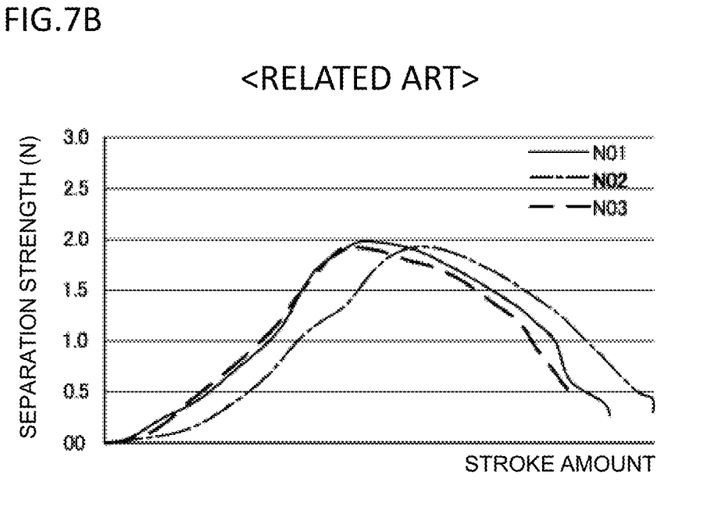
FIG. 7B is comparison characteristic view of separation strengths of the conventional structure illustrating effects of the method for non-penetration joining of members in accordance with the first illustrative embodiment of the present invention.

Also, as shown in FIG. 1, the backside of the undercut part 4cc of the joining member 4 caulks the excess thickness of the preformed part 5c between the step part 4b of the joining member 4 and the upper surface of the receiving mold 6, thereby pushing the excess thickness into the gap between the step part 4b and protruding part 4c of the joining member 4 and the preformed part 5c while work-hardening the excess thickness. Thereby, it is possible to non-detachably join both the members without performing retaining processing such as groove processing in advance for wrapping the excess thickness around the joining member 4. For this reason, the joining member 4 having a simple structure can be used, and the work-hardening of the excess thickness and the axial strength of the joining member 4, i.e., the strength in the separation direction can be increased. This is clear seen from FIG. 7A in which the separation strength of the first joining method is 2.5 N or higher and FIG. 7B in which the separation strength of the related art is 2.0 N or lower.

Also, the forming pressing mold is configured to advance to the predetermined bottom dead point to form the flat plate part 5b having a predetermined thickness from the preformed part 5c of the joined member 5. At this time, the bottom dead point is determined so that the protruding part 4c of the joining member 4 is not exposed, taking into consideration the ductility of the joined member 5, the fitting depth between the protruding part 4c of the joining member 4 and the blind hole 5a of the joined member 5, and the like. Thereby, the joining member 4 and the joined member 5 are joined in the state of non-penetration, i.e., in the state in which airtightness is maintained at the joined portion, without the protruding part 4c of the joining member 4 being exposed, so that the negative-side external terminal 3 having high airtightness can be manufactured. Also, since it is possible to omit the process of forming the joined member 5 in advance, it is possible to manufacture the inexpensive negative-side external terminal 3.

Figure 8A:
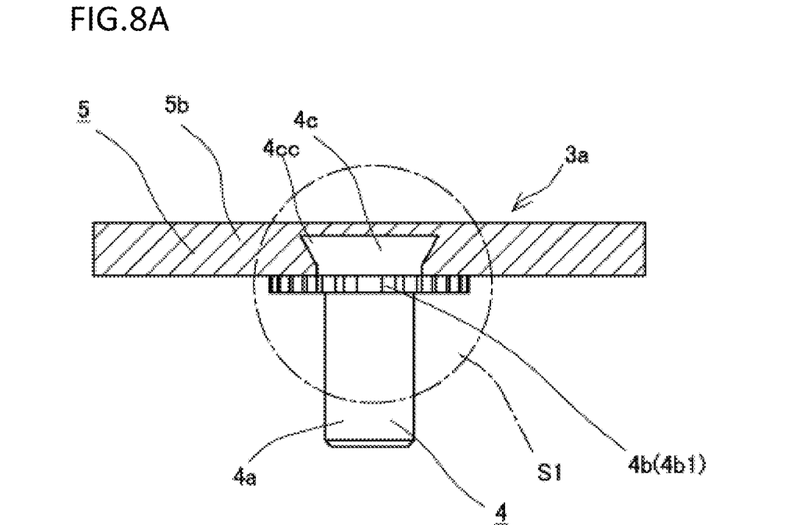
FIG. 8A is sectional view of main parts, depicting a first modified embodiment of the joining structure of members in accordance with the first illustrative embodiment of the present invention.
Figure 8B:
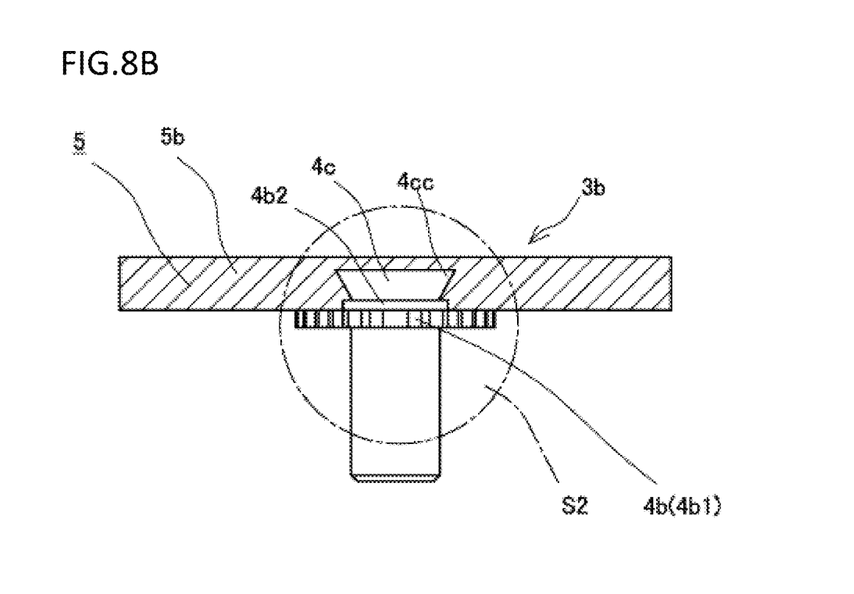
FIG. 8B is sectional view of main parts, depicting a second modified embodiment of the joining structure of members in accordance with the first illustrative embodiment of the present invention.

FIGS. 8A and 8B depicts non-penetration joining structures S1, S2 in accordance with a first modified embodiment and a second modified embodiment of the first joining method of the present invention. The non-penetration joining structure S1 is a structure obtained by forming the joined member 5 with the step part 4b of the joining member 4 being kept in the receiving mold (not shown). Also, the non-penetration joining structure S1 is a structure for enabling non-detachably joining both the members by compressing the joined member 5 against the receiving mold to plastically deform the joined member 5 and the joining member 4 at the same time and to wrap the excess thickness of the joined member 5 around the undercut part 4cc while forming the undercut part 4cc on the joining member 4. When the joined member 5 is formed to have the flat plate part 5b having a predetermined thickness, the excess thickness of the joined member 5 is wrapped around and into the gaps of the step part 4b having the tooth-shaped outer periphery, so that the large circular cylinder step part 4b1 is formed below the neck of the flat plate part 5b.

Also, in the non-penetration joining structure S2, a member having a small circular cylinder step part 4b2 between the step part 4b and the protruding part 4c is used as the joining member 4. The non-penetration joining structure S2 has the same structure as the first modified embodiment, except the small circular cylinder step part 4b2. Thereby, since any of the non-penetration joining structures S1, S2 has the large circular cylinder step part 4b1 below the neck, not only the friction resistance at the periphery of the outer side of the step part 4b of the joining member 4 but also the resistance in the rotating direction increases as a result of the wrapping of the excess thickness of the preformed part 5c around the outer periphery of the tooth-shaped step part, so that the negative-side external terminals 3a, 3b having the high strength in the rotating direction can be obtained.

Figure 9A:
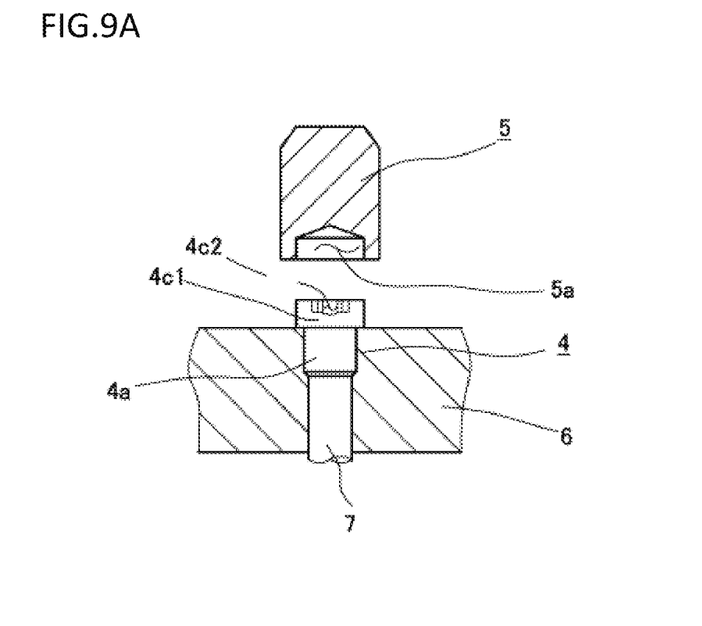
FIG. 9A is a joining process view of members, illustrating a modified embodiment of the joining method of members in accordance with the first illustrative embodiment of the present invention.
Figure 9B:
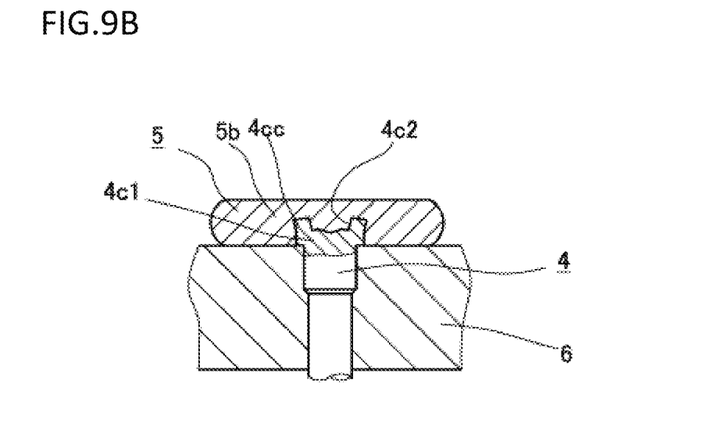
FIG. 9B is a joining process view of members, illustrating a modified embodiment of the joining method of members in accordance with the first illustrative embodiment of the present invention.

FIGS. 9A and 9B depict a joining method of members in accordance with a modified embodiment of the first joining method of the present invention. In this joining method, a member having the shaft part 4a and a joining protruding part 4c1 having a diameter larger than the shaft part and a non-circular hole 4c2 formed in an upper surface thereof is used as the joining member 4. The joining method includes a fitting process of placing the joined member 5 over the joining member 4 so that the blind hole 5a of the joined member 5 is fitted to the joining protruding part 4c1 of the joining member 4, and a forming process of the joined member 5.

In the fitting process, as shown in FIG. 9A, the shaft part 4a is positionally determined by the receiving mold 6 and the knockout pin 7 with the joining protruding part 4c1 of the joining member 4 being in contact with the upper surface of the receiving mold 6. In this state, the joined member 5 is advanced relative to the joining member 4 in the receiving mold 6, and the joined member 5 is placed over the joining member 4 from the upper so that the protruding part 4c of the joining member 4 is positioned in the blind hole 5a of the joined member 5. Thereby, the joined member 5 is partially fitted to the joining member 4 and is thus kept to the joining member 4.

In the forming process, the forming pressing mold (not shown) is arranged, and as shown in FIG. 9B, the forming pressing mold is advanced to a predetermined bottom dead point, relative to the joining member 4 positionally determined in the receiving mold 6 and the joined member 5 fitted to the joining member from the upper of the members. The bottom dead point of the forming pressing mold is set so that the joined member 5 is compressed to form the flat plate part 5b having a predetermined thickness and the joining protruding part 4c1 is not exposed, like the bottom dead point of the first joining method.

As the forming pressing mold is advanced, the forming pressing mold compresses the joined member 5 to form the flat plate part 5b having a predetermined thickness. At this time, the joining protruding part 4c1 of the joining member 4 is plastically deformed via the joined member 5, so that an outer periphery of an upper end of the joining protruding part is flattened outward and the undercut part 4cc is formed. While the joining protruding part 4c1 of the joining member 4 is formed, the joining member 4 and the joined member 5 are non-detachably joined in the state of non-penetration, i.e., in the state in which airtightness is maintained at the joined portion. Also, in the forming process, when the forming pressing mold is advanced to the predetermined bottom dead point, the forming pressing mold plastically deforms the joining protruding part 4c1 via the joined member 5. However, since the joining protruding part 4c1 has the non-circular hole 4c2, the joining protruding part is likely to be flattened outward over an entire circumference thereof, so that the undercut part 4cc can be easily formed. Thereby, it is possible to improve the strength in the axial direction, i.e., in the separation direction.

Second Illustrative Embodiment

Figure 10A:
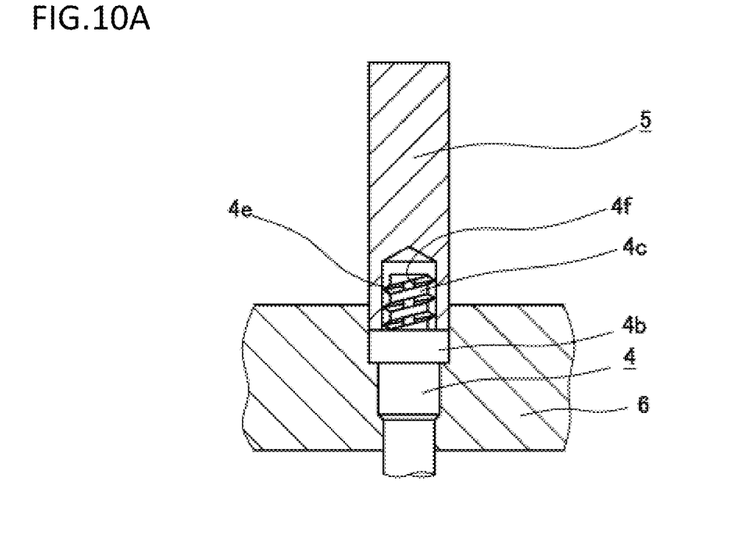
FIG. 10A is a process view of the joining method of members in accordance with a second illustrative embodiment of the present invention.
Figure 10B:
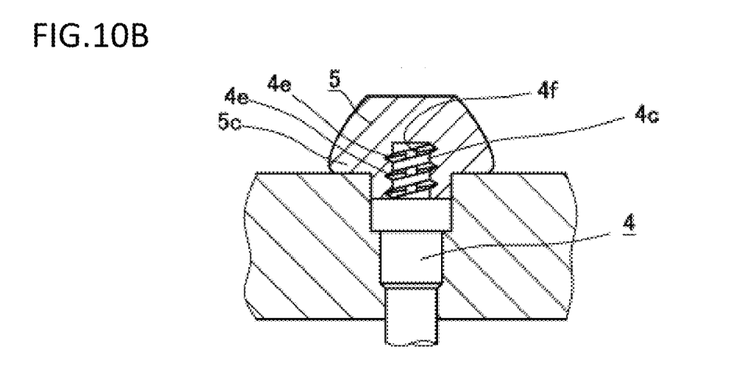
FIG. 10B is a process view of the joining method of members in accordance with a second illustrative embodiment of the present invention.
Figure 10C:
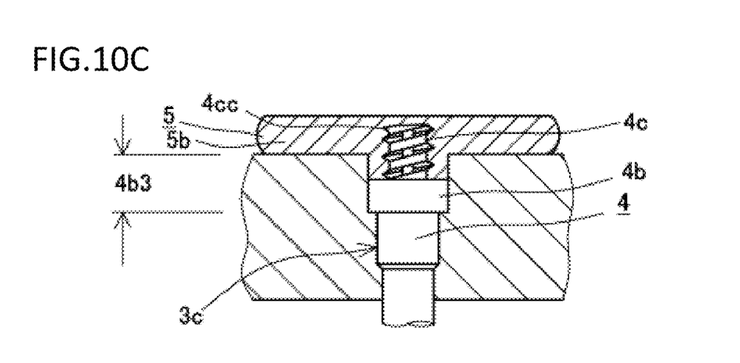
FIG. 10C is a process view of the joining method of members in accordance with a second illustrative embodiment of the present invention.

A method for non-penetration joining of members in accordance with a second illustrative embodiment of the present invention (hereinafter, referred to as 'second joining method') will be described with reference to the drawings (the same components and same functional components as the first joining method are denoted with the same reference numerals). In FIGS. 10A, 10B and 10C, the second joining method includes a fitting process of the joining member 4 and the joined member 5, a preforming process of the joined member 5 and a forming process of the joined member 5. The fitting process is similar to the first joining method, as shown in FIG. 10A, and is different from the first joining method in that the step part 4b of the joining member 4 is kept in the receiving mold 6 and the protruding part 4c of the joining member 4 has a different shape. In the below, the differences are described in detail. The protruding part 4c more protrudes upward than the upper surface of the receiving mold 6, and has threads 4e formed on the outer periphery thereof. The thread 4e is formed with a vertical groove 4f extending in the axial direction. In the meantime, the thread 4e may not be formed with the vertical groove 4f. In this case, the strength in the rotating direction is slightly lowered but the separation strength is not lowered.

In the preforming process, a preforming pressing mold (not shown) configured to compress an upper part of the joined member 5 is arranged. The preforming pressing mold is configured to advance relative to the joined member 5, and to compress the upper part of the joined member 5 within a range in which the protruding part 4*c* of the joining member 4 is not plastically deformed, thereby forming the preformed part 5*c* corresponding to a preliminary shape formed in the preforming pressing mold, as shown in FIG. 10B. At this time, the excess thickness of the joined member 5 is wrapped around and into the gap between the protruding part 4*c* of the joining member 4 and the joined member 5, between the two adjacent threads 4*e*, 4*e*, and the vertical grooves 4*f*.

In the forming process, a forming pressing mold (not shown) is arranged. As shown in FIG. 10C, the forming pressing mold is configured to advance to a predetermined bottom dead point, and to compress the preformed part 5*c* to form the flat plate part 5*b* having a predetermined thickness. At the same time, the forming pressing mold is configured to plastically deform a protruding end of the protruding part 4*c* of the joining member 4 and to flatten the same outward, thereby forming the undercut part 4*cc*. Thereby, it is possible to achieve the similar effects to the first joining method and to manufacture the negative-side external terminal 3*c* having a step part 4*b*3 having an arbitrary length below a neck. Also, it is possible to improve the axial length in both the separation direction and the pushing-in direction and to improve the strength in the rotating direction by the excess thickness wrapped around and into the vertical grooves 4*f*.

As described above, the present invention includes keeping the metallic joining member 4 having the protruding part 4*c* by the receiving mold 6 so that the protruding part 4*c* is exposed, placing the joined member 5 over the joining member 4 so that the protruding part 4*c* of the joining member 4 is positioned in the blind hole 5*a* of the joined member 5, and compressing the joined member 5 against the receiving mold 6 to plastically deform the joined member 5 and the joining member 4 at the same time and to wrap the excess thickness of the joined member 5 around the undercut part 4*cc* while forming the undercut part 4*cc* on the joining member 4, thereby non-detachably joining both the members. By this configuration, it is possible to join the joining member 4 and the joined member 5 while forming the joined member 54 so that the protruding part 4*c* of the joining member is not exposed. Also, a composite component can be manufactured in which the joining member 4 and the joined member 5 are joined in the state of non-penetration, i.e., in the state in which airtightness is maintained at the joined portion. Also, it is not necessary to form the joined member 5 in advance, so that it is possible to save the manufacturing cost of the composite component. Furthermore, the undercut part 4*cc* of the joining member 4 forms a groove around which the excess thickness of the joined member 5 is to be wrapped, so that it is possible to non-detachably join both the members without performing extra processing such as groove processing in advance. Also, the excess thickness of the joined member 5 is caulked by the backside of the undercut part 4*cc*, so that the adhesiveness between the joining member 4 and the joined member 5 is improved and the high axial strength can be thus obtained.

Also, according to the present invention, the joined member 5 and the joining member 4 are preferably closely contacted at the undercut part 4*cc*. In this case, the excess thickness of the joined member 5 is caulked by the backside of the undercut part 4*cc*, so that it is possible to improve the adhesiveness between the joining member 4 and the joined member 5.

Also, according to the present invention, the joined member 5 may be made of a material softer than the joining member 4, and the joining member 4 may be caused to be deformed using the work-hardening of the joined member 4. In this case, the fluidity of the joined member 5 is made better to improve the adhesiveness between the joining member 4 and the joined member 5.

In order to increase the friction resistance in the rotating direction to improve the strength in the rotating direction, preferably, the protruding part 4*c* of the joining member 4 of the present invention has the step part 4*b* widely enlarged in the vicinity of the protruding end, the undercut part 4*cc* is formed at a position closer to the protruding end than the step part 4*b*, and the excess thickness of the joined member 5 is wrapped around the outer side of the step part 4*b*, as well, so that the joining member 4 and the joined member 5 are joined.

Also, in order to increase the strength in the rotating direction as the excess thickness of the joined member 5 is introduced, preferably, the outer periphery of the step part 4*b* of the joining member 4 of the present invention has a tooth shape.

Also, the present invention provides the non-penetration joining structure including the metallic joining member 4 having the protruding part 4*c*, the joined member 5 having the blind hole 5*a* in which the protruding part 4*c* of the joining member 4 can be inserted, and the undercut part 4*cc* plastically processed at the protruding part 4*c* of the joining member 4 by compressing the joined member 5 with the protruding part 4*c* of the joining member 4 being inserted in the blind hole 5*a* of the joined member 5 and configured to non-detachably join both the members by wrapping the excess thickness of the joined member 5 around the undercut part. By this configuration, the undercut part 4*cc* of the joining member 4 forms a groove around which the excess thickness of the joined member 5 is wrapped, so that the joined member 5 is prevented from being separated. Also, the excess thickness of the joined member 5 is caulked by the backside of the undercut part 4*cc* of the joining member 4, so that the adhesiveness between the members is improved and the high axial strength is thus obtained. Also, since the joined portion is in a non-penetration state in the blind hole 5*a*, the joining structure having high airtightness is obtained.

Also, in order to increase the axial strength, i.e., the separation strength, preferably, the undercut part 4*cc* of the present invention is configured to closely contact the joined member 5 and the joining member 4.

In order to make the fluidity of the joined member 5 better to improve the adhesiveness between the joined member 5 and the joining member 4, preferably, the joined member 5 of the present invention is made of a material softer than the joining member 4, and the joining member 4 is caused to be deformed using the work-hardening of the joined member 5.

In order to increase the resistance in the rotating direction to obtain the high strength in the rotating direction, preferably, the protruding part 4*c* of the present invention has the step part 4*b* widely enlarged in the vicinity of the protruding end, the undercut part 4*cc* is formed at a position closer to the protruding end than the step part 4*b*, and the excess thickness is wrapped around the outer side of the step part 4*b*, as well, so that the joining member 4 and the joined member 5 are joined. Also, preferably, the outer periphery of the step part 4*b* has a tooth shape.

In the meantime, in each modified embodiment of the first joining method of the present invention and in the second joining method, the horizontal arrangement of the receiving mold 6 and the joined member 5 made of a material softer than the joining member 4 can be applied. Also, the joining member 4 and the joined member 5 are not limited to the metal materials, and may be made of resin materials. Also, the specific configurations of the respective parts of the present invention are not limited to the illustrative embodiments, and can be diversely modified without departing from the gist of the present invention.

DESCRIPTION OF REFERENCE NUMERALS

3 . . . negative electrode-side external electrode terminal
4 . . . joining member
4a . . . shaft part
4b . . . step part
4c . . . protruding part
4cc . . . undercut part
5 . . . joined member
5a . . . blind hole
5b . . . flat plate part
6 . . . receiving mold

What is claimed is:

1. A method for non-penetration joining of members, the method comprising:
   keeping a joining member having a protruding part by a receiving mold so that the protruding part is exposed;
   placing a joined member over the joining member so that the protruding part of the joining member is positioned in a blind hole of the joined member, and
   compressing the joined member against the receiving mold to plastically deform the joined member and the joining member at the same time and to wrap excess thickness of the joined member around an undercut part while forming the undercut part on the joining member, thereby non-detachably joining both the members.

2. The method for non-penetration joining of members according to claim 1, wherein the joined member and the joining member are closely contacted at the undercut part.

3. The method for non-penetration joining of members according to claim 2, wherein the joined member is made of a material softer than the joining member, and the joining member is caused to be deformed using work-hardening of the joined member.

4. The method for non-penetration joining of members according to claim 2, wherein the protruding part has a step part widely enlarged in the vicinity of a protruding end, the undercut part is formed at a position closer to the protruding end than the step part, and the excess thickness is wrapped around an outer side of the step part, as well, so that the joining member and the joined member are joined.

5. The method for non-penetration joining of members according to claim 1, wherein the joined member is made of a material softer than the joining member, and the joining member is caused to be deformed using work-hardening of the joined member.

6. The method for non-penetration joining of members according to claim 5, wherein the protruding part has a step part widely enlarged in the vicinity of a protruding end, the undercut part is formed at a position closer to the protruding end than the step part, and the excess thickness is wrapped around an outer side of the step part, as well, so that the joining member and the joined member are joined.

7. The method for non-penetration joining of members according to claim 1, wherein the protruding part has a step part widely enlarged in the vicinity of a protruding end, the undercut part is formed at a position closer to the protruding end than the step part, and the excess thickness is wrapped around an outer side of the step part, as well, so that the joining member and the joined member are joined.

8. The method for non-penetration joining of members according to claim 7, wherein an outer periphery of the step part has a tooth shape.

9. The method for non-penetration joining of members according to claim 1, wherein the joined member is compressed down and outwardly with respect to the joining member.

10. The method for non-penetration joining of members according to claim 1, wherein
    the protruding part has a step part and a protruding end,
    the step part is widely enlarged in the vicinity of the protruding end, and
    the undercut part is formed at a position closer to the protruding end than the step part.

* * * * *